Patented Oct. 3, 1950

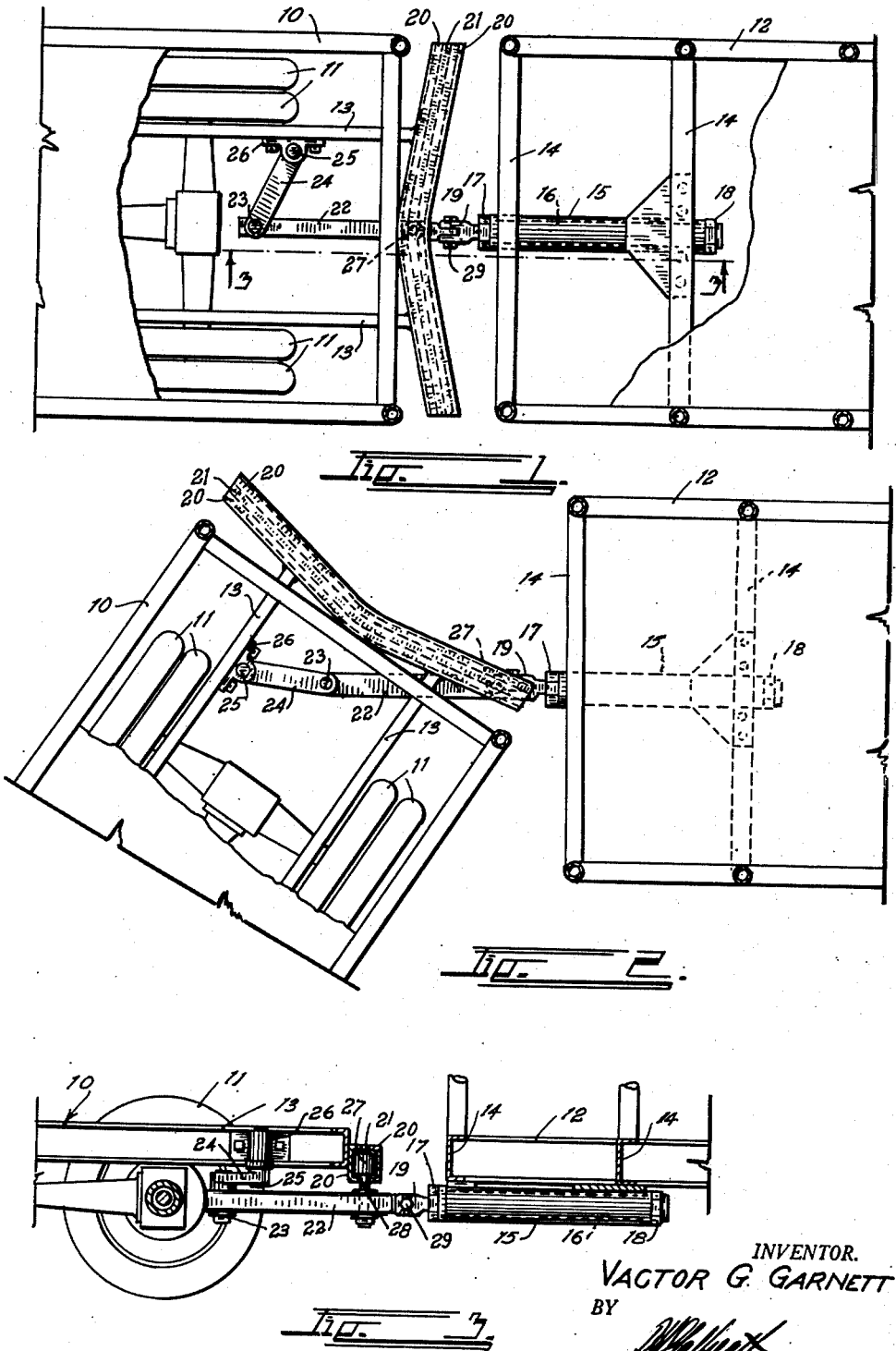

2,524,312

UNITED STATES PATENT OFFICE 2,524,312

TRAILER HITCH

Vactor G. Garnett, Pasadena, Calif.

Application October 2, 1948, Serial No. 52,510

4 Claims. (Cl. 280—33.05)

This invention relates to a device for attaching a trailer to a tow car and has for its principal object the provision of means whereby, when the trailer is following in a straight line with the tow car, it will be relatively closely coupled therewith and so constructed that, when the tow car turns either to the right or left, the device will automatically increase the distance between the tow car and trailer to prevent any interference between the sidewardly turning bodies of the two vehicles.

The advantages of the improved hitch reside in the fact that a greater load carrying capacity can be obtained from the tow car and trailer without increasing the total length of tow car and trailer. This advantage becomes valuable due to the various State laws, which limit the length of a combined tow car and trailer so that any intervening space between the two results in load carrying loss.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a plan view of the improved trailer hitch as it would appear upon a trailer following a tow car in the "straight ahead" position;

Fig. 2 is a similar view illustrating the action of the device when the tow car makes a left turn; and Fig. 3 is a longitudinal section taken on the line 3—3, Fig. 1.

In the drawing, a tow car is indicated by the numeral 10 with its rear wheels at 11 and a trailer is indicated at 12. The tow car 10 is provided with the usual longitudinally extending chassis members 13 and the trailer is provided with transversely extending chassis members 14. The trailer 12 is provided with a medially positioned tongue tube 15 fixedly secured at the middle of the frame members 14 and open at both of its extremities.

A cylindrical tongue bar 16 extends throughout the length of the tongue tube 15 and is prevented from moving rearwardly therein by means of a front collar 17. A nut 18 is threaded on the rearward extremity of the tongue bar 16 to prevent it from moving forwardly in the tongue tube 15. It is however, free to rotate in this tube. The forward extremity of the tongue bar 16 terminates in a bifurcated clevis 19.

A track member, preferably consisting of two inwardly facing, uniformly spaced channel members 20 extends transversally across the rear of the tow car 10. The two channel members 20 are uniformly separated from each other at the top by means of a spacer plate 21 and are in open spaced apart relation at the bottom. The channel members 20 are supported in any desired manner as by welding them to the rearward extremities of the chassis members 13.

A draw bar 22 extends forwardly beneath the channel members 20 to a pivot member 23 on the extremity of a swinging link 24. The link 24 is mounted on the lower extremity of a link shaft 25 which is journalled in a vertical bearing member 26 secured to one of the chassis members 13. The rearward extremity of the draw bar 22 is supported from a roller 27 vertically positioned between the channels 20. A roller shaft 28 extends downwardly through the draw bar 22 to support the latter.

The rearward extremity of the draw bar 22 is fitted between the furcations of the clevis 19 and is hingedly secured therein by means of a draw bar pin 29. The draw bar pin is positioned horizontally so as to allow relative vertical movement between the tow car and trailer and so as to prevent relative horizontal movement between the draw bar 22 and the tongue bar 16. Lateral tilting movement between the tow car and the trailer is accommodated by rotation of the tongue bar 16 in the tongue tube 15.

It can be readily seen that, if the tow car turns toward the left, the channel members 20 are swung toward the right over the draw bar 22 causing the roller 27 to move rearwardly. This rearward movement is accommodated by the link 24 which also swings rearwardly as shown in Fig. 2. This rearward movement of the link and the roller is imparted to the draw bar 22 to increase the coupled distance between the two vehicles.

The same procedure accommodates a right turn in which event the channels 20 will swing to the left about the roller 27. The entire draw bar load is transmitted through the roller to the channels 20.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A device for coupling a trailer to a tow car comprising: a track member extending across the rearward extremity of said tow car transversely thereof and inclined rearwardly towards opposite ends; a vertically positioned roller movably supported by said track member movable towards the ends thereof from a normal position midway the length thereof; a draw bar supported from said roller below said track member; a swinging link pivoted at its one extremity to the front end of said draw bar; means for hingedly mounting the other extremity of said link on said tow car in transversely spaced relation to the longitudinal center of the tow car to maintain the forward extremity of said draw bar substantially on the center line of said tow car; and means for attaching a trailer to the rearward extremity of said draw bar having pivotal connection with the draw bar.

2. A device for coupling a trailer to a tow car comprising: a transversally extending track member extending across the rearward extremity of said tow car and having portions extending diagonally at a rearward incline from the transverse center of the tow car towards opposite sides thereof; a vertically positioned roller supported by said track member and movable along the track member from a normal position at the center of the track member towards the ends thereof; a draw bar supported at its rear end from said roller below said track member; a swinging link extending transversely of the tow car and pivoted at its one extremity to the front end of said draw bar; means for hingedly mounting the other extremity of said link on said tow car about a vertical axis to maintain the forward extremity of said draw bar substantially on the center line of said tow car; a horizontal draw bar pin mounted at the rearward extremity of said draw bar; a tongue bar hingedly mounted at its front end on said pin for tilting in a vertical plane; a tongue tube fixedly mounted longitudinally on said trailer at the forward extremity of the center thereof, said tongue bar extending throughout the length of said tongue tube and longitudinally thereof; and means for preventing longitudinal movement of said tongue bar in said tongue tube.

3. A device for coupling a trailer to a tow car comprising: a hollow transversely extending track member fixed adjacent the rear end of said tow car and formed with a longitudinally extending slot in its under portion; a draw bar; a guide roller in said track member, a shaft projecting upwardly from said draw bar adjacent the rear end thereof and through the slot of said track member and rotatably carrying said roller; a pivot bar with one end vertically pivoted to a side of said tow car for swinging movement longitudinally of the tow car, and with the other end vertically pivoted to said draw bar adjacent the forward end thereof at a point adjacent the longitudinal center line of said tow car; and a tongue consisting of companion members slidably and rotatably engaged with each other and being one fixed to the trailer longitudinally thereof and the other pivoted at its front end to the rear end of said draw bar.

4. A device for coupling a trailer to a tow car comprising: a transversely extending track member fixed adjacent the rear end of said tow car; a draw bar; a guide member attached to said draw bar adjacent the rear end thereof and engaging said track member; a longitudinally movable pivot bar with one end vertically pivoted to a side of said tow car, and with the other end vertically pivoted to said draw bar adjacent the forward end thereof at a point adjacent the longitudinal center line of said tow car; a hitch member with the forward end thereof horizontally pivoted to the rear end of said draw bar; a longitudinally extending sleeve fixed to said trailer telescopically and rotatably engaging said hitch member; and means to maintain said hitch member in telescopic and rotatable engagement with said sleeve.

VACTOR G. GARNETT.

REFERENCES CITED

The following references are of record in the file of this patent:

UNITED STATES PATENTS

| Number | Name | Date |
|---|---|---|
| 2,001,408 | Burton | May 14, 1935 |
| 2,328,387 | Meats | Aug. 31, 1943 |